United States Patent
Kaplan

(10) Patent No.: US 9,359,532 B2
(45) Date of Patent: Jun. 7, 2016

(54) PULVERULENT ADHESIVE WHICH IS DISPERSIBLE IN WATER

(71) Applicant: EMS-PATENT AG, Domat/Ems (CH)

(72) Inventor: Andreas Kaplan, Chur (CH)

(73) Assignee: EMS-PATENT AG, Domat/Ems (CH)

( * ) Notice: Subject to any disclaimer, the term of this patent is extended or adjusted under 35 U.S.C. 154(b) by 120 days.

(21) Appl. No.: 14/221,930

(22) Filed: Mar. 21, 2014

(65) Prior Publication Data

US 2015/0051343 A1 Feb. 19, 2015

(30) Foreign Application Priority Data

Aug. 16, 2013 (EP) .................................... 13180630

(51) Int. Cl.
| | |
|---|---|
| *C09J 11/06* | (2006.01) |
| *C09J 5/06* | (2006.01) |
| *C08J 5/06* | (2006.01) |
| *C08G 18/79* | (2006.01) |
| *C08G 18/80* | (2006.01) |
| *C08L 75/04* | (2006.01) |
| *C08K 5/42* | (2006.01) |

(52) U.S. Cl.
CPC ............... *C09J 11/06* (2013.01); *C08G 18/798* (2013.01); *C08G 18/8074* (2013.01); *C08J 5/06* (2013.01); *C08K 5/42* (2013.01); *C08L 75/04* (2013.01); *C08G 2150/20* (2013.01)

(58) Field of Classification Search
CPC ..................................... C09J 11/06; C09J 5/06
USPC ........................................ 106/287.25, 287.32
See application file for complete search history.

(56) References Cited

U.S. PATENT DOCUMENTS

| | | | |
|---|---|---|---|
| 4,381,332 A | 4/1983 | Fulmer et al. | |
| 4,477,619 A | 10/1984 | Lattimer et al. | |
| 4,569,963 A | 2/1986 | Hisaki et al. | |
| 4,740,528 A | 4/1988 | Garvey et al. | |
| 4,742,095 A | 5/1988 | Markusch et al. | |
| 5,959,027 A | 9/1999 | Jakubowski et al. | |
| 6,084,018 A | 7/2000 | Wildburg et al. | |
| 6,482,889 B1 | 11/2002 | Kurz | |
| 6,506,832 B1 | 1/2003 | Derian et al. | |
| 7,705,088 B2 * | 4/2010 | Durairaj | C07C 271/58 524/589 |
| 2002/0193508 A1 | 12/2002 | Derian et al. | |
| 2004/0249062 A1 | 12/2004 | Derian et al. | |
| 2007/0205393 A1 | 9/2007 | Durairaj et al. | |
| 2007/0243375 A1 | 10/2007 | Kohashi et al. | |
| 2012/0115993 A1 | 5/2012 | Kaplan | |
| 2014/0135458 A1 | 5/2014 | Kaplan | |

FOREIGN PATENT DOCUMENTS

| | | |
|---|---|---|
| CN | 1981083 A | 6/2007 |
| CN | 101250251 A | 8/2008 |
| CN | 101296974 A | 10/2008 |
| CN | 101395195 A | 3/2009 |
| DE | 199 13 042 A1 | 10/2000 |
| EP | 0 137 427 A2 | 4/1985 |
| EP | 0 739 961 A1 | 10/1996 |
| EP | 0 835 891 A1 | 4/1998 |
| EP | 1 038 899 A1 | 9/2000 |
| EP | 2 159 241 A1 | 3/2010 |
| EP | 2 450 389 A1 | 5/2012 |
| JP | S42-002896 Y1 | 2/1967 |
| JP | S59093774 A | 5/1984 |
| JP | H02-151619 A | 6/1990 |
| JP | 09-328474 A | 12/1997 |
| JP | 2000-303054 A | 10/2000 |
| JP | 2009-528347 A | 8/2009 |
| NZ | 228773 A | 7/1991 |
| WO | WO 94/22935 A1 | 10/1994 |
| WO | WO 02/50148 A2 | 6/2002 |
| WO | WO 2007/100399 A1 | 9/2007 |
| WO | WO 2010/085602 A1 | 7/2010 |

* cited by examiner

*Primary Examiner* — Kelechi Egwim
(74) *Attorney, Agent, or Firm* — Leydig, Voit & Mayer, Ltd.

(57) ABSTRACT

The invention relates to a pulverulent adhesive for textile reinforcing plies which is dispersible in water, comprising: a) 85 to 97% by weight of at least one at least partially capped, low-molecular isocyanate, b) 15 to 3% by weight of an alkyl naphthalene sulphonate as wetting agent, and also c) 0 to 10% by weight of additives, binders being excluded, with the proviso that the formulation components a+b+c produce 100% by weight.

20 Claims, No Drawings

PULVERULENT ADHESIVE WHICH IS DISPERSIBLE IN WATER

CROSS-REFERENCE TO A RELATED APPLICATION

This application claims the benefit of European Patent Application No. 13 180 630.9, filed Aug. 16, 2013, the disclosure of which is incorporated herein by reference.

The invention relates to a pulverulent adhesive for reinforcing plies which is dispersible in water and is distinguished by comprising partially capped, low-molecular isocyanate and also alkyl naphthalene sulphonate as wetting agent and possibly additives. Furthermore, the invention relates to a method for the production of such a pulverulent adhesive and to the use thereof for the treatment of reinforcing plies for the production of reinforced rubber products.

It has proved to be advantageous in the production of fibre-reinforced rubber products if, in order to improve the adhesion, an adhesive is used between the textile reinforcing ply and the rubber. Such an adhesive is important in particular in the field of tyre cord as reinforcing ply and other highly-loaded composite materials with reinforcing fibres. It has become known in particular for application in the tyre cord field to use resorcinol formaldehyde latex systems (RFL) for joining synthetic fibres to rubber products. This can take place in a technical method such that, in a so-called one-step process, impregnation of the reinforcing element with a mixture of RFL and an adhesive is implemented.

Also so-called two-step processes are known from the state of the art, in which firstly impregnation of the reinforcing element with the adhesive and a glycidyl compound is undertaken and then, in a second step, the application of RFL is effected.

Specially coordinated adhesives are also already known from the state of the art for such processes. DE 19913042 A1 describes an adhesive for the treatment of reinforcing plies for the production of reinforced rubber products in the form of an aqueous dispersion. The adhesive is thereby based on isocyanates.

Furthermore, a pulverulent adhesive is known from EP 2450389 A1 which is also dispersible in water and consists of a low-molecular isocyanate, wetting agent, and also at least one binder and possibly a catalyst and/or an additive. The production of this adhesive is thereby effected such that the capped isocyanate is used as dispersion and the binder as a solution and is stirred in water together with the other additives. This dispersion is subsequently ground to the desired particle size by means of wet-grinding and is thereafter subjected to a drying, preferably a fluidised-bed spray drying.

However, it is disadvantageous in the case of the above-described adhesive that the achievable particle size and the particle size distribution is still not sufficiently satisfactory. Also the method for the production of this adhesive is complicated and economically uneconomic via the indirect route of dispersion and wet-grinding.

Starting herefrom, it is therefore the object of the present invention to propose a pulverulent adhesive for textile reinforcing plies which is dispersible in water and which has a simplified production process and a narrow distribution of the particle size and, nevertheless, has comparable dispersibility.

The object is achieved by the features of the pulverulent adhesive and the method described herein.

The adhesive according to the invention hence comprises 85 to 97% by weight of at least one at least partially capped, low-molecular isocyanate and 15 to 3% by weight of an alkyl naphthalene sulphonate as wetting agent and also possibly 0 to 10% by weight of additives, binders being excluded.

The adhesive according to the invention is hence distinguished relative to the state of the art, in particular relative to the adhesive according to EP 2 450 389 A1, by managing to have no binders at all and by a special wetting agent, namely alkyl naphthalene sulphonate, being contained within the limits indicated herein.

It is thereby essential to the invention that, in the case of the adhesive according to the invention, binders can be dispensed with entirely and that a specifically selected wetting agent is present in a precisely defined quantity range. Although the operation takes place without binders, the pulverulent formulation is equivalent or even superior, in its properties, to the state of the art, in particular to EP 2 450 389 A1. It has thereby been shown that it is essential that the wetting agent is contained in the adhesive in the range between 3 and 15% by weight. If less than 3% by weight of wetting agent (relative to the sum of the capped isocyanate and the wetting agent) is used, a satisfactory dispersion is no longer established. This leads, on the one hand, to material losses and, on the other hand, to inadequate adhesion of the tyre cord or transmission belt cord to the rubber (peel adhesion). In the case of more than 15% by weight of wetting agent, the adhesion of the cord to the rubber likewise suffers. The adhesion to the cord, for example to a tyre cord or transmission belt cord, is determined via the peel adhesion. The peel adhesion must thereby be at least 140 newton/inch. In the case of lower adhesion values, reliable use of the reinforced rubber product, e.g. of the tyre or transmission belt, is no longer provided.

It is essential to the invention in the case of the adhesive according to the invention that, as wetting agent, exclusively alkyl naphthalene sulphonates, preferably sodium diisobutyl naphthalene sulphonate, is used. It has been shown that in particular the selection of this wetting agent is advantageous in the production of the adhesive according to the invention since both the wetting agent and the isocyanate can be used as pulverulent starting substances and hence a simple dry-grinding to achieve the desired particle size can be implemented without losses of wetting agent thereby occurring.

The combination according to the invention of the above-described selected wetting agent with the isocyanate has the advantage furthermore that the use of a binder can be dispensed with. Binders are normally used in this field in order to enable provision of a flowable, low-dust powder. The binder which is usually used in the case of adhesives from the state of the art concerns binders which are selected from the group consisting of vinyl alcohol-vinyl acetate copolymers, polyvinylpyrrolidones, polyvinyl alcohols, polyacrylic acid salts, salts of polyacrylic acid copolymers, polysaccharides, starch, cellulose, guar, tragacantine acid, dextrane, alginates and their carboxymethyl-, methyl-, hydroxyethyl-, hydroxypropyl derivatives, casein, soya protein, gelatines, lignin sulphonates and mixtures hereof. Binders of this type are hence excluded according to the invention.

The low-molecular isocyanate which is used in the case of the adhesive according to the invention has preferably a molar mass of ≤500 gmol, preferably a molar mass in the range of 90-400 gmol and very particularly preferred a molar mass in the range of 150-300 gmol. Examples of such low-molecular isocyanates are:

4,4'-diphenylmethane diisocyanate (4,4'-MDI),
2,4'-diphenylmethane diisocyanate (2,4'-MDI),
3,4'-diphenylmethane diisocyanate (3,4'-MDI),
2,2'-diphenylmethane diisocyanate (2,2'-MDI),
2,3'-diphenylmethane diisocyanate (2,3'-MDI),
2,4-toluene diisocyante, 2,6-toluene diisocyanate, 1-isocyanato-3-isocyanatomethyl-3,5,5-trimethylcyclohexane, 1,4-naphthalene diisocyanate (1,4-NDI), 1,5-naphthalene diisocyanate (1,5-NDI), isophorone diisocyanate (IPDI), hexamethylene diisocyanate (HDI) or mixtures hereof.

According to the present invention, it is preferred furthermore if the at least one at least partially capped, low-molecular isocyanate is partially or completely blocked. There may be mentioned as examples of blocking agents, monophenols, in particular phenol, resorcinol, cresol, trimethylphenols or tert. butylphenols, lactams, in particular $\epsilon$-caprolactam, $\delta$-valerolactam or laurinlactam, oximes, in particular methyl ethyl ketoxime (butanone oxime), methyl amyl ketoxime (heptanone oxime) or cyclohexanone oxime, readily enol-forming compounds, in particular acetoacetic acid ester, acetylacetone or malonic acid derivatives, primary, secondary or tertiary alcohols, glycol ether, secondary aromatic amines, imides, isocyanates, mercaptans, triazoles and also mixtures hereof.

In the case of the adhesive according to the invention, it is very particularly preferred if the at least one at least partially capped, low-molecular isocyanate is a uretdione. Uretdiones are dimerised isocyanates. The dimerisation can thereby be accelerated by basic catalysts, such as pyridine or tert. phosphanes, aromatic isocyanates thereby dimerise even without catalyst. A preferred example of such a uretdione is the uretdione of diphenylmethane diisocyanate (MDI).

Since a uretdione is capped only by itself, during firing of the adhesive which is applied on the reinforcing ply, e.g. the cord, in particular the tyre cord or transmission belt cord, no volatile substances are released, for which reason the rollers and rolls of the coating plant show very much fewer coatings or impurities so that the interruption times for cleaning operations are greatly reduced.

In contrast to MDI which is capped with $\epsilon$-caprolactam and used today almost exclusively as adhesive, the process with the uretdione of MDI can take place at approx. 60° C. lower firing temperatures. Thanks to the lower firing temperature, the treated reinforcing ply, e.g. the tyre cord or transmission belt cord, is softer, i.e. more flexible, and displays fewer breaking points. Because of this increased flexibility of the treated reinforcing ply, instead of the glycidyl ether based on ethylene glycol which is used nowadays together with the adhesive, also glycidyl ethers of polyhydric alcohols, such as e.g. sorbitol, can be used. These in fact lead to slight stiffening of the treated reinforcing ply but also to an improved overfiring behaviour and to an improved ageing behaviour without too high stiffness of the treated reinforcing ply in total, e.g. the tyre cord or transmission belt cord, requiring to be taken into account.

The adhesive formulation according to the invention, in addition to the components of the low-molecular isocyanate and of the alkyl naphthalene sulphonate as wetting agent, which are essential to the invention, can also comprise additives in the indicated quantity ratios. There may be mentioned as additives, catalysts, defoamers, in particular long-chain alcohols, high polymeric glycols, fatty acid ethoxylates, trialkyl methyl amines, silicones or mixtures thereof, particularly preferred silicones in the form of silicone emulsions, colourants, in particular carbon black and/or fillers, in particular silicates, and also mixtures hereof.

It is preferred of the composition with respect to quantities if the adhesive comprises 90 to 96% by weight, preferably 93 to 96% by weight and very particularly preferred 94 to 95.5% by weight, of the at least one partially capped, low-molecular isocyanate and also 4 to 10% by weight, preferably 7 to 4% by weight, particularly preferred 6 to 4.5% by weight, of the alkyl naphthalene sulphonate as wetting agent. The additives can be contained in a quantity of 0.1 to 10% by weight, the sum of the individual components requiring to produce 100% by weight.

In the case of the adhesive according to the invention, it is however very particularly preferred if this consists exclusively of the capped isocyanate and of the alkyl naphthalene sulphonate in the indicated quantity ratios. For particular preference, the adhesive thereby consists of 95% by weight of the at least one capped isocyanate and 5% by weight of the alkyl naphthalene sulphonate.

The dispersible powder of the adhesive has a volume-average particle diameter in the range of 0.1 to 40 µm, preferably in the range of 0.2 to 20 µm and very particularly preferred in the range of 0.3 to 12 µm.

The particle diameter of the powder is determined in the powder itself by means of laser measurement according to ISO 13320. The particle size of the powder according to the invention is hence significantly below the particle size of the powder according to EP 2 450 389 A1, which is in the range of 50 to 50,000 µm. This can be attributed to the fact that, in the state of the art, binders which lead to an agglomeration are contained in the formulation so that significantly greater particles are produced. The adhesive according to the invention has hence the advantage that small particles, the size of which then no longer changes during the dispersion, are already present in the powder.

This is also confirmed by the examination which is carried out with respect to dispersibility.

The dispersion properties of the obtained powder are determined as follows. In a glass beaker, deionised water is introduced and this is stirred with a magnetic stirrer. The sample to be dispersed is added. The dispersibility is judged visually after 1 minute and after 10 minutes stirring and evaluated with numbers from 0 to 100, 0 meaning no dispersion and 100 complete dispersion.

The particle size distribution ($d_{50}$ and $d_{95}$ value) of the dispersion obtained after 10 minutes is determined by means of laser measurement according to ISO 13320. It has now been shown that the $d_{50}$ value of the powder according to the invention is at most 5 µm, preferably at most 2 µm and very particularly preferred at most 1.5 µm. The $d_{95}$ value of the pulverulent formulation according to the invention is thereby at most 10 µm, preferably at most 6 µm and particularly preferred at most 5 µm.

The smaller the particle diameter of the powder, the lower is the tendency thereof for sedimentation in the dipping bath during the cord coating and hence the lifespan of the dipping bath, the $d_{95}$ value being more important as criterion than the $d_{50}$ value since, in the case of the $d_{95}$ value, also the larger particles are detected.

The laser measurements are implemented according to the principle of laser diffraction with a granulometer Cilas 1064 of Quantachrome GmbH (Germany).

The peel adhesion is determined, according to ASTM 4393, on eight-layer test pieces with a symmetrical construction (2 layers of cord and 6 layers of rubber, cf. FIG. 2, ASTM 4393). The tension test is effected at a measuring temperature of 23° C. with a tension speed of 20 mm/min. The tension testing is evaluated according to option 1 of ASTM 4393. As cord, non-activated Cord Performance Fibres HMLS Polyester, 1,100×1×2 dtex, ZS 470, 1×50 is used and, as rubber, Continental B458, thickness 0.4 mm. The vulcanisation is effected at 154° C. and 6.5 bar for 30 min.

Furthermore, the invention relates to a method for the production of a pulverulent adhesive for textile reinforcing plies which is dispersible in water. The method according to the invention is distinguished by 85 to 97% by weight of the at least partially capped, low-molecular isocyanate, with 15 to 3% by weight of the alkyl naphthalene sulphonate as wetting agent and possibly with the addition of pulverulent additives, being subjected to dry-grinding, with the proviso that the dry-grinding is implemented such that the particle size distribution ($d_{50}$ and $d_{95}$ value) of the dispersion obtained after ten minutes in deionised water by means of laser measurement according to ISO 13320 is, for the $d_{50}$ value, at most 5 µm and, for the $d_{95}$ value, at most 10 µm. For the method according to the invention, the possibilities described above in the case of the adhesive naturally apply with respect to the quantity ratios, the formulation components, the particle size of the powder and the particle size distribution of the dispersion.

It must be regarded as an advantage of the method according to the invention that, by means of the dry-grinding specifically, a small particle size of the powder can be set within the indicated limits of 0.1 µm to 40 µm. This particle size is then essentially maintained during production of a dispersion.

The components of the adhesive at least partially capped, low-molecular isocyanate, wetting agent and possible additives are mixed in a powder mixer and subsequently subjected to dry-grinding. The components can however also be metered individually into the mill.

In the case of the method according to the invention, it has thereby proved to be advantageous if the dry-grinding is implemented by means of a jet mill. In particular when using a jet mill, the above-mentioned values can be achieved with respect to the particle size.

In the case of jet mills, also termed air jet mills, the particles are ground in a gas flow, the grinding gas, the comminution of the particles being effected by means of the kinetic energy introduced by the grinding gas and in fact either by the mutual particles impacts, e.g. in the counter-jet, or by impingement of the particles on impact plates. Filters, air separators which can be designed statically or dynamically or combinations thereof serve for separation of the ground material from the grinding gas.

Examples of jet mills of different constructions are spiral jet mill, high density bed jet mill, Finnpulva counter-jet mill, NPK I-mill, Majac counter-jet mill, oval tube jet mill or fluidised-bed counter jet mills.

For preference, fluidised-bed counter jet mills with a static or dynamic air separator are used, dynamic air separators being preferred. External air separators are possible, however this is preferably integrated in the mill. For example a continuously controllable separator wheel serves as dynamic air separator. The upper particle limit can thereby be controlled via the speed of rotation of the separator wheel. With increasing speed of rotation, the size of the particles allowed through thereby reduces.

An adhesive, as described above, is suitable, for particular preference, for the treatment of reinforcing plies for the production of reinforced rubber products, as mentioned initially in the description.

The reinforcing plies concern in particular textile reinforcing plies, e.g. made of polyester, polyethylene, polyamide, rayon, cotton, bast fibres, sisal, hemp, flax or coconut fibres. These thus treated reinforcing plies are used in particular for the production of tyre cord, conveyor belt cord, transmission belt cord or cord for mechanical rubber parts or composites.

The reinforced rubber products concern in particular tyres, both for automotive vehicles and for utility vehicles, and transmission belts, e.g. V-belts, V-ribbed belts, round belts, flat belts or toothed belts. The subject according to the invention is explained in more detail with reference to the subsequent examples without restricting said subject to the special embodiments shown here.

Table 1 shows the materials used in the examples and comparative examples.

| Component | Trade name | Description | Manufacturer |
|---|---|---|---|
| low-molecular isocyanate (A1) | — | 4, 4'-methylene-bis(phenylisocyanate)-dimer (CAS No. 17589-24-1), pulverulent | EMS CHEMIE AG, Switzerland |
| low-molecular isocyanate (A2) | Grilbond IL-6 50% F | low-molecular 4,4'-diphenylmethane-diisocyanate capped with caprolactam 50% by weight of aqueous dispersion | EMS CHEMIE AG, Switzerland |
| wetting agent (B1) | Nekal BX dry | sodium salt of diisobutylene naphthalene sulphonic acid (CAS No. 27213-90-7), pulverulent sodium sulphate content approx. 25% by weight | BASF, Germany |
| wetting agent (B2) | Tamol NN 8906 | sodium salt of naphthalene sulphonic acid polycondensate, pulverulent sodium sulphate content approx. 60% by weight | BASF, Germany |
| binder | Mowiol 4-88 * | polyvinyl alcohol Mw ** 31,000 87-89% hydrolised | Kuraray Europe GmbH, Germany |

Table 2 contains the compositions of the examples according to the invention

| | | Examples | | |
|---|---|---|---|---|
| Component | Unit | 1 | 2 | 3 |
| low-molecular isocyanate (A1), pulverulent | % by weight | 95 | 90 | 85 |
| wetting agent (B1), pulverulent | % by weight | 5 | 10 | 15 |
| solid content | % by weight | 100 | 100 | 100 |

Embodiment with reference to example 1 of Table 2.

The pulverulent low-molecular isocyanate (A1) is mixed with the pulverulent wetting agent (B1) in the weight ratio 95:5 in a powder mixer. The powder mixture is then placed in a CONDUX fluidised-bed jet mill CGS 50 which is operated with compressed air.

The following parameters are used for the grinding:
Speed of rotation of the separator wheel [1/min]: 3,450
Grinding air pressure (high pressure) [bar]: 6
Grinding air quantity
(relative to an air temperature of 20° C.) [m³h]: 1,000
Throughput [kgh]: 30
For examples 2 and 3 and the comparative examples 4 and 5, the same grinding parameters are used.

Table 3 reproduces the composition of the comparative examples.

| Component | Unit | Comparative examples | | 6 | |
|---|---|---|---|---|---|
| | | 4 | 5 | as dispersion parts by weight | as dry substance % by weight |
| low-molecular isocyanate (A1), pulverulent | % by weight | 98 | 82 | — | — |
| wetting agent (B1), pulverulent | % by weight | 2 | 18 | — | — |
| low-molecular isocyanate (A2), 50% by weight of dispersion | — | — | — | 133 | 66.5 |
| wetting agent (B2), pulverulent | — | — | — | 3.5 | 3.5 |
| binder 25% by weight of solution | — | — | — | 120 | 30 |
| water | — | — | — | 29.5 | — |
| solid content | % by weight | 100 | 100 | 35 | 100 |

In comparative example 6 of Table 3, firstly an aqueous dispersion is produced from the educts for the production of the dispersible powder, which dispersion is subjected subsequently to a wet-grinding and is dried in a fluidised-bed spray drying. Comparative example 6 hence corresponds to example 1 from EP 2 450 389 A1.

Table 4 shows the results of the dispersion tests.

| | Example 1 | | Example 2 | | Example 3 | | Comparative example 4 | | Dry substance from comparative example 6 | |
|---|---|---|---|---|---|---|---|---|---|---|
| Dispersion degree | | | | | | | | | | |
| after 1 min | 96 | | 96 | | 97 | | 20 | | 95 | |
| 10 min | 99 | | 99 | | 99 | | 35 | | 98 | |
| Particle size [µm] | d50 | d95 | d50 | d95 | d50 | d95 | d50 | d95 | d50 | d95 |
| after 10 min | 1.4 | 3.9 | 1.3 | 4 | 1.4 | 4 | —* | —* | 1.2 | 4.5 |

*Not determined since the degree of dispersion too low

The powders from examples 1 to 3 according to the invention display better dispersibility than the dry substance from comparative example 6 which corresponds to example 1 from EP 2 450 389 A1 (Table 4). In the case of the powder from comparative example 4, the dispersibility is too poor for commercial applications, therefore measurement of the particle size was dispensed with.

In the case of the particle size measurement after the dispersion, the powders from examples 1 to 3, at the $d_{95}$ value, reveal, with 3.9 µm or 4.0 µm, significantly smaller values than the dry substance from comparative example 6 with 4.5 µm.

Table 5 summarises the results of the adhesion test.

| | Unit | Examples | | | Comparative example 5 | Comparative example 6 |
|---|---|---|---|---|---|---|
| | | 1 | 2 | 3 | | |
| Peel adhesion | N/inch | 270 | 220 | 180 | 120 | 270 |

The adhesion values of the powders according to the invention from examples 1 to 3 are respectively very significantly above the minimum value of the peel adhesion of 140 N/inch. In contrast, the peel adhesion of the powder from comparative example 5 is significantly below that. With the powder according to the invention from example 1, the same peel adhesion as with the powder from comparative example 6 is produced.

The invention claimed is:

1. A pulverulent adhesive for textile reinforcing plies which is dispersible in water, comprising:
   a) 85 to 97% by weight of at least one at least partially capped, low-molecular isocyanate,
   b) 15 to 3% by weight of an alkyl naphthalene sulphonate as wetting agent, and
   c) 0 to 10% by weight of additives, binders being excluded, with the proviso that the formulation components a+b+c produce 100% by weight.

2. The pulverulent adhesive according to claim 1, wherein the powder has an average particle diameter in the range of 0.1 µm to 40 µm.

3. The pulverulent adhesive according to claim 1, wherein the particle size distribution ($d_{50}$, $d_{95}$) of the dispersion obtained after 10 minutes stirring with de-ionised water, by means of laser measurement according to ISO 13320 is, for $d_{50}$, at most 5 µm, and, for $d_{95}$, at most 10 µm.

4. The pulverulent adhesive according to claim 1, wherein the adhesive comprises 90 to 96% by weight of the at least partially capped, low-molecular isocyanate and 10 to 4% by weight of the alkyl naphthalene sulphonate as wetting agent.

5. The pulverulent adhesive according to claim 1, wherein the at least one low-molecular isocyanate has a molar mass of less than or equal to 500 g/mol.

6. The pulverulent adhesive according to claim 1, wherein the at least one low-molecular isocyanate is an aromatic, aliphatic or cycloaliphatic isocyanate selected from the group consisting of
   4,4'-diphenylmethane diisocyanate (4,4'-MDI),
   2,4'-diphenylmethane diisocyanate (2,4'-MDI),
   3,4'-diphenylmethane diisocyanate (3,4'-MDI),
   2,2'-diphenylmethane diisocyanate (2,2'-MDI),
   2,3'-diphenylmethane diisocyanate (2,3'-MDI), 2,4-toluene diisocyanate, 2,6-toluene diisocyanate, 1-isocyanato-3-isocyanatomethyl-3,5,5-trimethylcyclohexane, 1,4-naphthalene diisocyanate (1,4-NDI), 1,5-naphthalene diisocyanate (1,5-NDI), isophorone diisocyanate (IPDI), hexamethylene diisocyanate (HDI) and mixtures hereof.

7. The pulverulent adhesive according to claim 1, wherein the at least one at least partially capped, low-molecular isocyanate is partially or completely blocked with a blocking agent selected from the group consisting of monophenols, phenol, resorcinol, cresol, trimethylphenols or tert-butylphenols, lactams, ε-caprolactam, δ-valerolactam or laurinlactam, oximes, methyl ethyl ketoxime (butanone oxime), methyl amyl ketoxime or cyclohexanone oxime, readily enol-forming compounds, acetoacetic acid ester, acetylacetone or malonic acid derivatives, primary, secondary or tertiary alcohols, glycol ether, secondary aromatic amines, imides, isocyanates, mercaptans, triazoles and mixtures hereof.

8. The pulverulent adhesive according to claim 1, wherein the at least one at least partially capped, low-molecular isocyanate concerns a uretdione.

9. The pulverulent adhesive according to claim 8, wherein the at least one at least partially capped, low-molecular isocyanate concerns a uretdione of diphenylmethane diisocyanate (MDI).

10. The pulverulent adhesive according to claim 1, wherein the alkyl naphthalene sulphonate is a sodium diisobutyl naphthalene sulphonate.

11. The pulverulent adhesive according to claim 1, wherein said pulverulent adhesive consists exclusively of the at least partially capped isocyanate and the alkyl naphthalene sulphonate.

12. The pulverulent adhesive according to claim 11, wherein the pulverulent adhesive consists of 95% by weight of the at least one capped isocyanate and 5% by weight of the alkyl naphthalene sulphonate.

13. The pulverulent adhesive according to claim 1, wherein the pulverulent adhesive comprises 0.1% to 10% by weight of additives which are selected from catalysts, defoamers, colourants and/or fillers, and mixtures hereof.

14. A method for producing a pulverulent adhesive for textile reinforcing plies which is dispersible in water according to claim 1, wherein 85 to 97% by weight of the at least partially capped, low-molecular isocyanate, with 15 to 3% by weight of the alkyl naphthalene sulphonate as wetting agent, is subjected to dry-grinding, wherein the particle size distribution ($d_{50}$ and $d_{95}$) of the dispersion obtained after 10 minutes stirring in deionised water by means of a laser measurement according to ISO 13320 is, for the $d_{50}$ value, 5 μm and, for the $d_{95}$ value, 10 μm.

15. The method according to claim 14, wherein the dry-grinding is implemented until the $d_{50}$ value is at most 5 μm and the $d_{95}$ value is at most 10 μm.

16. The method according to claim 14, wherein the dry-grinding is implemented with a jet mill.

17. A method for the treatment of reinforcing plies for the production of reinforced rubber products comprising treating the plies with an adhesive in accordance with claim 1.

18. The pulverulent adhesive according to claim 2, wherein the particle size distribution ($d_{50}$, $d_{95}$) of the dispersion obtained after 10 minutes stirring with de-ionised water, by means of laser measurement according to ISO 13320 is, for $d_{50}$, at most 5 μm, and, for $d_{95}$, at most 10 μm.

19. The pulverulent adhesive according to claim 2, wherein the adhesive comprises 90 to 96% by weight of the at least partially capped, low-molecular isocyanate and
    10 to 4% by weight of the alkyl naphthalene sulphonate as wetting agent.

20. The pulverulent adhesive according to claim 2, wherein the at least one low-molecular isocyanate has a molar mass of less than or equal to 500 g/mol.

\* \* \* \* \*